Sept. 30, 1958   A. F. DEVORAK   2,854,046
WINDROWING ATTACHMENT FOR COMBINE
HAVING A STRAW CHOPPER
Filed June 20, 1956   2 Sheets-Sheet 1

Arthur F. Devorak
INVENTOR.

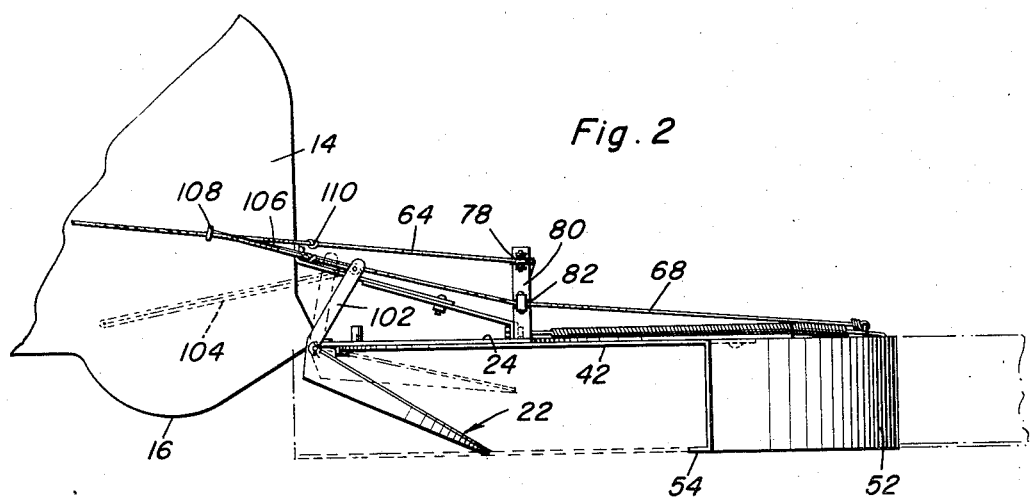
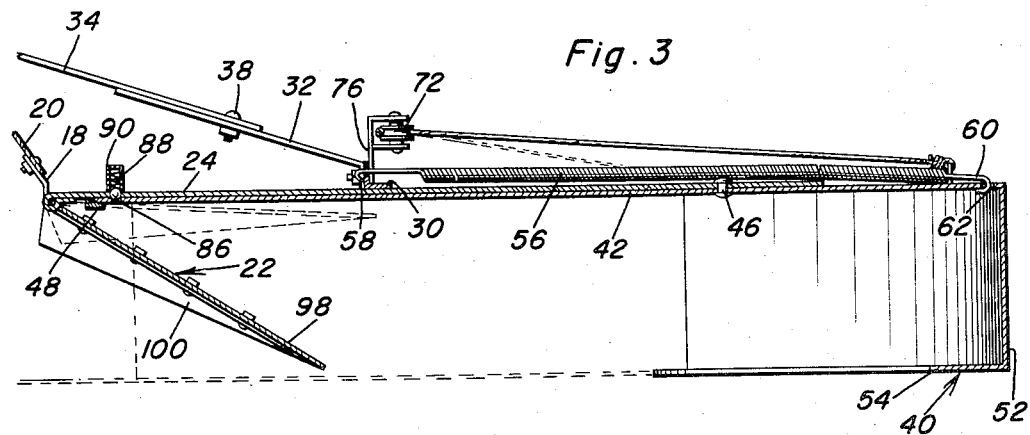
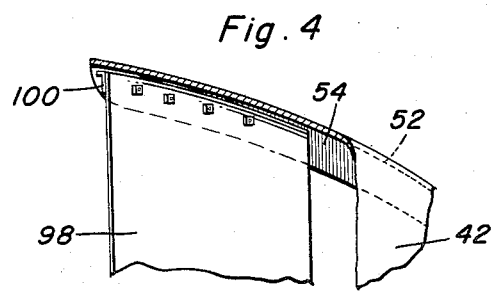

2,854,046
WINDROWING ATTACHMENT FOR COMBINE HAVING A STRAW CHOPPER

Arthur F. Devorak, Canby, Minn.

Application June 20, 1956, Serial No. 592,598

6 Claims. (Cl. 146—117)

This invention generally relates to an attachment for combines and more particularly relates to an attachment for positioning straw discharged from the combine in a windrow wherein the straw may be gathered by a suitable machine from such windrow.

In the harvesting of grain and especially wheat or similar grain, a combine is employed which does the cutting and threshing in a single operation with the straw being chopped by a straw chopper and normally distributed over substantially the entire width of the swath of grain being cut so that the straw may be plowed under or otherwise returned to the soil for enriching the same. However, it is often desirable that the straw be saved so that it may be employed for commercial use such as bedding or feed. Accordingly, it is the primary object of the present invention to provide an attachment for such combines which may be employed for positioning the straw in windrows to facilitate the gathering or picking up of the straw after passage of the combine.

Another object of the present invention is to provide an attachment for windrowing the straw discharged from a combine including a gathering device which is pivotal from a left hand to right hand position for permitting the straw to be discharged directly behind the combine thereby positioning the straw into a minimum number of windrows.

Other objects of the present invention will reside in its simplicity of construction, ease of attachment to existing combines, ease of operation, effectiveness for its particular purposes and its relatively inexpensive manufacturing and maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a side elevational view of the construction of Figure 1;

Figure 3 is a longitudinal, vertical sectional view on an enlarged scale taken substantially upon a plane passing along section line 3—3 of Figure 1 illustrating the details of construction of the attachment;

Figure 4 is a perspective view of a portion of the deflector, and

Figure 1:
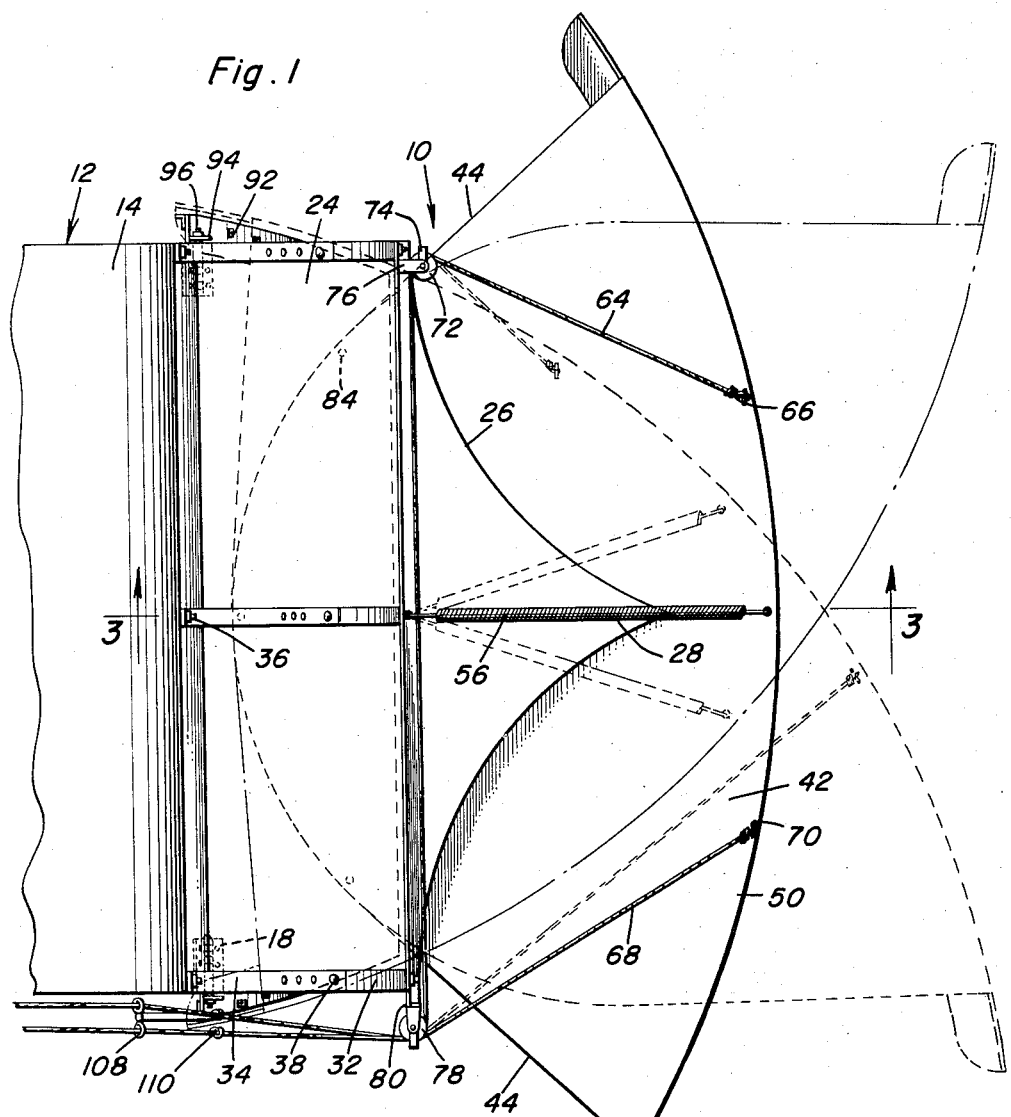
Figure 1 is a plan view of the combine attachment of the present invention illustrating the device attached to the rear of the combine.

Referring now specifically to the drawings, the numeral 10 generally designates the attachment of the present invention for support upon the rear of a combine generally designated by the numeral 12 with the rear of the combine 12 being provided with the usual discharge hood 14 that is normally provided with a straw chopper therein for discharging straw downwardly from the open lower end 16 of the discharge hood 14.

The attachment of the present invention includes a plurality of hinges 18 attached to support means 20 forming a portion of the discharge hood 14 with the hinge means supporting a pivotal deflector shield 22 and also a rearwardly extending plate 24 which is provided with inwardly curved edge portions 26 terminating in a pointed rear end 28. The plate 24 is provided with a transverse angle iron member 30 substantially adjacent the center thereof with the angle iron member 30 being attached to one end of a bracket 32 having the other end 34 thereof attached to the discharge hood 14 of the combine 12 by fastening bolts 36. The two portions 32 and 34 forming the bracket are adjustably secured together by fastening means 38 wherein the position of the plate 24 in relation to a horizontal plane may be adjusted and in relation to the discharge hood 14 for varying the height of the attachment 10.

A deflector hood generally designated by the numeral 40 is provided with an enlarged plate 42 underlying the plate 24 and including an arcuate inner edge 44 with a pivot pin or rivet 46 pivotally securing the plate 42 to the plate 24 for swinging movement thereunder wherein the arcuate edge 44 is disposed adjacent to the front end of the plate 24 and received within an L-shaped guide 48 at the front end thereof. The rear edge of the plate 42 is also arcuate as designated by the numeral 50 and provided with an arcuate flange or plate 52 terminating in an inturned flange 54 which is parallel to the plate 42 and extends only a relatively short distance but projects beyond the arcuate edges 44 of the plate 42 substantially as illustrated in Figure 1.

An elongated tensioned coil spring 56 has one hooked end thereof 58 secured through a suitable aperture in the upstanding flange of the angle iron member 30 and the other end thereof is provided with a hook 60 which extends through an aperture 62 adjacent the outer arcuate edge 50 of the plate 42 and it will be noted in Figure 1 that this spring 56 extends over the pivot pin 46 which joins the plate 42 to the plate 24. Specifically, the tensioned coil spring 56 forms an over-center spring wherein the plate 42 will be urged in an extreme position when it is moved away from the position with the spring 56 disposed directly over the pivot pin 46.

For urging the deflector hood 40 about the pivot pin 46, a flexible line 64 is terminally secured to a bracket 66 on one side of the plate 42 and a flexible line 68 is attached to a bracket 70 on the other side of the plate 42 in relation to the pivot pin 46. The flexible line 64 is entrained over a pulley 72 having a guide 74 and being mounted on an upstanding bracket 76 secured to the end of the angle iron member 30. The flexible line 64 then extends transversely in parallel relation to the angle iron member 30 and is entrained over a pulley 78 mounted on an upstanding bracket 80 that has a pulley 82 disposed therebelow over which the flexible line 68 is entrained substantially as illustrated in Figures 1 and 2. The flexible lines 64 and 68 then extend forwardly of the combine 12 to a control position at the operator's seat for permitting pivotal movement of the deflector hood by the operator.

The arcuate edge 44 of the plate 42 is provided with a pair of spaced apertures 84 for receiving a ball detent 86 spring urged by a spring 88 mounted in a housing 90 at the center of the plate 24 thereby retaining the plate 42 in each of its three positions that is, the extreme left hand position, the extreme right hand position and the center position with the center position being illustrated in full line in Figure 1 and the other two positions illustrated in dotted line and the tension of the coil spring 56 will urge the deflector hood 40 to the left and right hand extreme positions after initial movement away from the center position by pulling and loosening on the selective flexible line 64 and 68.

The deflector shield 22 is provided with end members 92 having lugs 94 pivotally mounted on the pins 96 of the hinge means 18 for swingably mounting a plate 98 which acts as a deflector shield and which is provided with removable edges 100. Secured to one end of the deflector shield 22 is an upstanding arm 102 having a piece of chain 104 attached thereto for limiting the downward pivotal movement of the shield 22 and also for retaining the shield 22 in raised position. Also connected to the upper end of the arm 102 is a pivotal rod 106 having a pair of eyes 108 thereon in encircling relation to the flexible lines 64 and 68. The flexible lines 64 and 68 are each provided with a knot 110 or enlarged portion which will not pass through the eyes 108 and which will engage the eye 108 for raising the shield 22 when the deflector hood 40 is pivoted to either its extreme right or left hand position. As the flexible line 64 or 68 moves towards the operator for pivoting the plate 42 to either of its extreme positions, the respective knot 110 will engage the eye 108 thereby lifting the deflector shield 22 thereby automatically assuring that the deflector shield 22 will be held in raised or inoperative position when the deflector hood 40 is employed for discharging the straw to the left or right hand side of the combine. The shield 22 primarily prevents entry of foreign material between plates 24 and 42 for permitting easy swinging movement of the deflector hood 40.

Figure 5:
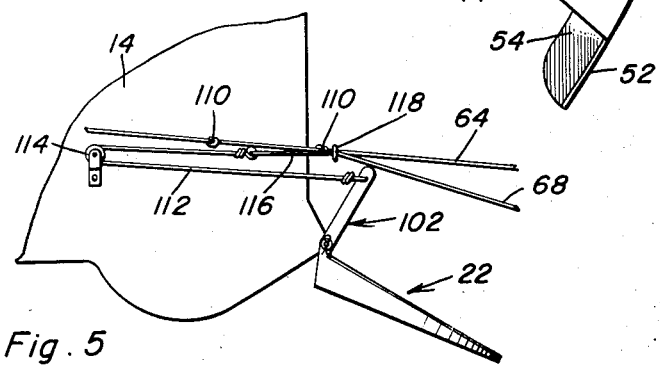
Figure 5 is a partial elevation of a modified detail of the invention.

As illustrated in Figure 5 rod 106 may be replaced by a flexible line 112 connected to the upper end of the arm 102 and entrained over a pulley 114 attached to the discharge hood 14. The line 112 is connected to rod 116 having loop 118 engaging lines 64 and 68 rearwardly of knot 110 whereby the shield 22 will be held in the upper position by tension on the line 64 and 68 extending rearwardly to the hood 40 rather than tensioning the forward portions of the control lines.

In practical operation of the invention, it is only necessary to reverse the position of the deflector hood 40 at the end of each round of combining wherein the straw may be discharged into a single windrow with several rounds or rows of combine straw into a single windrow by alternating between the extreme left hand position, the center position and the extreme right hand position of the deflector hood 40. This reduces the number of windrows of straw to a minimum thereby further facilitating the picking up of such straw in a subsequent operation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A straw windrowing attachment for a combine having a straw chopping device comprising a rearwardly extending adjustable mounting plate adapted to be supported from the combine, a deflector hood pivotally attached to said plate for swinging in a generally horizontal plane about a vertical axis, said hood including a depending flange at the outer edge for gathering straw discharged from the combine into a windrow, and means for remotely controlling the position of said deflector hood, said deflector hood including an enlarged plate having an arcuate inner and outer edge, said enlarged plate underlying said mounting plate, a centrally disposed pivot pin interconnecting the plates, and an elongated tensioned spring means interconnecting the plates with the central portion of the spring means shifting over the pivot pin when the deflector hood moves from one extreme position to the other thereby resiliently urging the deflector hood to each of its extreme positions.

2. The combination of claim 1 wherein said control means includes a pair of flexible lines terminally secured to remote side portions of the deflector hood, said lines being entrained over a pulley system to the operator's position on the combine whereby selective longitudinal movement of the lines will cause pivotal movement of the deflector hood to either of its extreme positions.

3. A straw windrowing attachment for a combine having a straw chopping device comprising a rearwardly extending adjustable mounting plate adapted to be supported from the combine, a deflector hood pivotally attached to said plate for swinging in a generally horizontal plane about a vertical axis, said hood including a depending flange at the outer edge for gathering straw discharged from the combine into a windrow, and means for remotely controlling the position of said deflector hood, and a deflector shield mounted at the forward edge of said mounting plate for swinging movement in a generally vertical plane, said deflector shield including downturned side edges for directing straw directly behind the combine when the hood is in central position between its extreme positions.

4. The combination of claim 3 wherein said control means for the deflector hood automatically raises the deflector shield when the hood is moved to an extreme position and lowering the shield when the hood is moved to a central position for rendering the deflector shield inoperative when the hood is in one of its extreme positions and operative when the hood is in central position.

5. An attachment for the discharge hood of a combine for windrowing straw discharged therefrom, said attachment comprising a rearwardly extending enlarged plate, means for mounting said plate for adjustment in a generally horizontal plane about a substantially vertical axis, said mounting means including a mounting plate adapted to form a continuation of the rear edge of the discharge hood whereby straw discharged from the discharge hood will pass below the mounting plate and said enlarged plate, said enlarged plate having a depending arcuate flange thereon for guiding the straw into a windrow, and remote control means for moving said enlarged plate to one of its extreme positions whereby the arcuate flange has one edge disposed rearwardly of the other edge for guiding the straw into a windrow.

6. The combination of claim 5 wherein spring means is provided between said mounting plate and enlarged plate for urging the enlarged plate towards one of its extreme positions.

References Cited in the file of this patent

UNITED STATES PATENTS

| | | |
|---|---|---|
| 990,472 | Brown | Apr. 25, 1911 |
| 1,092,720 | Kluge | Apr. 7, 1914 |
| 2,708,582 | Adams | May 17, 1955 |
| 2,740,247 | Worrell | Apr. 13, 1956 |

FOREIGN PATENTS

| | | |
|---|---|---|
| 143,711 | Australia | Oct. 8, 1951 |